May 17, 1932.  G. YSEBOODT  1,858,759
RAIL JOINT CONNECTION
Filed Aug. 27, 1930
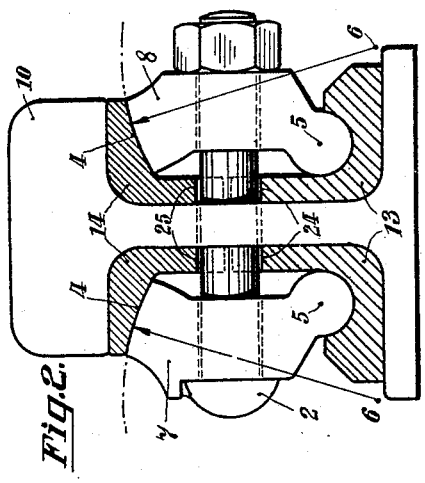
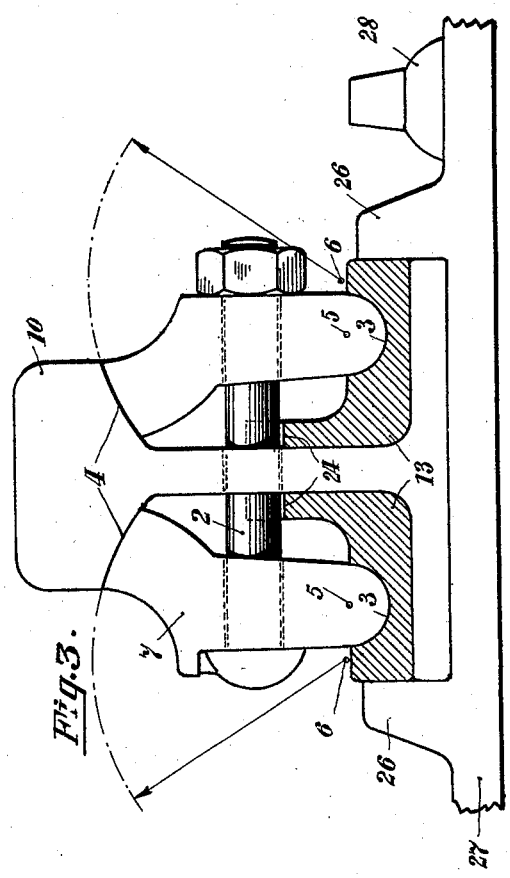
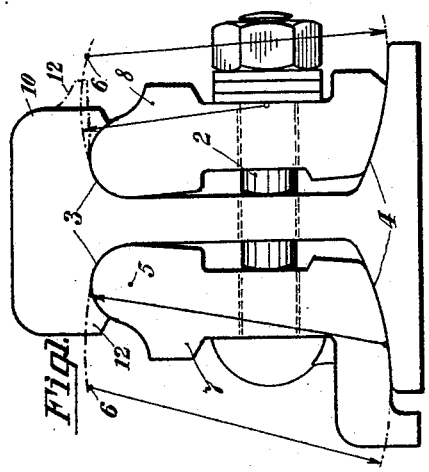
Inventor
Gustave Yseboodt Patented May 17, 1932

1,858,759

UNITED STATES PATENT OFFICE

GUSTAVE YSEBOODT, OF SCHAERBEEK-BRUSSELS, BELGIUM

RAIL JOINT CONNECTION

Application filed August 27, 1930, Serial No. 478,157, and in Germany August 27, 1929.

The known fish plates, which have two inclined surfaces, bear with these surfaces on correspondingly inclined surfaces of the head and base of the rail. However the disadvantage arises thereby that they only bear perfectly on the surfaces of the rail and can remain in this position, if they assume a position exactly parallel to the web of the rail. This position cannot however be obtained in practice.

This objection is chiefly due to the inclined surfaces and the central arrangement of the bolts connecting the fish plates to the rails. Through the clearance between bolts and holes in the rails and fish plates the upper portion of the fish plates can approach the web of the rails, whereas the lower portion moves away from the middle of the rail or inversely. This displacement occurs also when the bolts are screwed absolutely tight. If the bolts get loose, which is practically unavoidable, this displacement naturally occurs to an increased extent.

This is also the reason for the extremely rapid wear of the inclined surfaces of rails and fish plates. which quickly become rounded in use, and which only produce a connection with comparatively small resistance, when laying the track, which resistance decreases from day to day. This rapid wear is caused by the crosswise stresses of the rail end, impossible to prevent, even by most careful and consequently most expensive control of the track.

Further the weight of the known rails is comparatively heavy, as the inclined surfaces extend over the entire length of the rail, without the strength of the rail being increased thereby, because the inclined surfaces are situated much too near the centre of inertia of the rail.

These disadvantages are overcome according to the invention in that rails and fish plates form, either on the upper or on the lower edge of the fish plates, a hinge connection situated at a constant distance from the rail web. which hinge connection transmits the stresses exerted on the rail to the fish plates and prevents an inward or outward shifting of the corresponding edge of the fish plates, whereas the supporting surfaces opposite the hinge extend in a flat curve, the centre of this curve being situated outside the pivot axis of the hinge connection in such a manner that by tightening the fish plate bolts clamping of fish plates on the curved surfaces is obtained.

Several embodiments of the invention are illustrated by way of example in the accompanying drawings in which:

Fig. 1 shows in end view a connection at the joint of the first form of construction.

Fig. 2 shows the connection at the joint of the third form of construction in end view partly in section.

Fig. 3 is a similar view to Fig. 2 of the fourth form of construction.

According to Fig. 1 the connection at the joint consists of fish plates 7 and 8, having an upper portion 3 along an arc, the centre of the circle situated at 5. This arc-shaped portion 3 engages in a corresponding cavity of the rail head 10, so that a hinge connection is formed. The lower portion of the fish plate has a surface 4, which extends in the form of a flat arc, the centre of this arc being situated at 6. This surface 4 bears against a similar surface on the rail base. As the two centres 5 and 6 do not correspond the one to the other, a strong pressing together of the whole is attained by tightening a bolt.

The drawing also shows that this type of connection at the joint prevents any possibility of angular displacement of the fish plates in the one or other direction, as long as the bolt 2 is tight. However, even if the bolt works loose in service, only a displacement of the fish plate in one direction is possible, namely a displacement of the lower portion towards the outer side. This displacement is however much smaller than with ordinary fish plates and may be further reduced in that the bolt 2 is arranged more towards the bottom, so that it is below the centre of the fish plate (Fig. 1).

This arrangement of the bolt at the same time reduces the stresses occurring in the connection at the joint when the track is being travelled over.

The drawing also shows, that with the same contact surface of the wheel rim on the rail, i. e. at the same height of the lateral rail head wall, the weight of the rail head is much less heavy than in the known rails.

A saving in material is obtained by the concave surface 4 of the rail base. Thus, with the same weight of the different rails a better distribution of the material can be attained, according to the invention, and consequently the moment of inertia or the resistance of the rail against bending can be increased.

The life of the rails might also be increased by making the rail head thicker or by making its upper surface larger.

The saving in material, which is obtained by the omission of the inclined surface is so great, that the expenses for the additional rolling process for the grooves of arc shaped cross section of the rail head are more than balanced. The extension 12 of the head is scarcely greater than the clearance between the fish plate and rail web necessary with ordinary fish plates.

Consequently the contacting surface between the rail and fish plate in relation to the ordinary fish plate amounts to about 3:2.

The groove 3 may extend along the entire length of the rail head and may be produced by rolling, the extension 12 being rolled on at the same time as indicated in dot dash lines in Fig. 1.

This dot dash extension 12 is brought subsequently into the form shown by pressing down.

The groove 3 can evidently also be made by milling or in any other manner only in the end of the rail on a length corresponding to that of the fish plates, when however the remaining portion of the rail will be rolled in such a manner, that the lower surfaces of the rail head extend parallel to the bearing surface of the rail base.

Needless to say, these cavities may also be milled into finished existing rails, when it is immaterial, whether these rails are used or new.

In the form of construction shown in Fig. 2, the lower part of the fish plate engages in an intermediate part 13 and the curved supporting surface 4 is also provided on an intermediate part 14. A shifting of the intermediate parts in the direction of the longitudinal axis is prevented by cavities 24 and 25, which engage over the bolt 2.

According to Fig. 3 the hinge connection near the edge of the rail base is arranged in such a manner that the fish plate is inclined to the web of the rail in normal position.

This form of construction presents the advantage, that an automatic fitting of the fish plates occurs when the rail joint is being travelled over, so that the stresses on the bolts are reduced. The displacement of the intermediate part 13 is prevented by ribs 26 of the chair 27 which is fixed on the sleeper by means of screw bolts 28.

One of the two parts 13 and 14 (Fig. 2) or both these parts may be welded to the bearing surfaces, which is preferable when rails are to be used the supporting surfaces of which for the fish plates extend either parallel or at an angle to the bearing surface of the rail.

I claim:—

1. A rail joint connection, comprising in combination with the rail and the fish plate, a hinge connection formed between said rail and said fish plate at a constant distance from the rail web adapted to prevent lateral shifting of the edge of said fish plates, and slightly curved supporting surfaces opposite said hinge connection having the centre at a distance from the fulcrum of said hinge connection adapted on the fish plate bolts being tightened to clamp said fish plates against said rail through the intermediary of said joint.

2. A rail joint connection as specified in claim 1, in which the hinge connection is formed on the lower edge of the fish plate.

3. A rail joint connection, comprising in combination with the rail and the fish plate an intermediate part between said rail and said fish plate, a hinge connection on said fish plate mounted in said intermediate part, said fish plate having a slightly curved surface adapted to bear against a correspondingly shaped surface of said intermediate part, said rail and said intermediate part being shaped so as to prevent displacement of said intermediate part in longitudinal and transverse directions, and mechanical means for securing said intermediate part on said rail.

4. A rail joint connection, comprising in combination with the rail and the fish plate an intermediate part between said rail and said fish plate, a hinge connection on said fish plate mounted in said intermediate part, said fish plate having a slightly curved surface adapted to bear against a correspondingly shaped surface of said intermediate part, said rail and said intermediate part being shaped so as to prevent displacement of said intermediate part in longitudinal and transverse directions, said intermediate part being secured on said rail by welding.

In testimony whereof I affix my signature.

GUSTAVE YSEBOODT.